No. 756,713. PATENTED APR. 5, 1904.
J. A. SANDER.
MEAT CHOPPER.
APPLICATION FILED DEC. 11, 1902.
NO MODEL. 2 SHEETS—SHEET 1.

WITNESSES:
Henry Krug
Russell M. Everett

INVENTOR
John A. Sander,
BY
Drake & Co.
ATTORNEYS.

No. 756,713. PATENTED APR. 5, 1904.
J. A. SANDER.
MEAT CHOPPER.
APPLICATION FILED DEC. 11, 1902.
NO MODEL. 2 SHEETS—SHEET 2.

WITNESSES:
Henry Krug
Russell M. Everett

INVENTOR
John A. Sander,
BY
Drake
ATTORNEYS

No. 756,713.

Patented April 5, 1904.

UNITED STATES PATENT OFFICE.

JOHN A. SANDER, OF NEWARK, NEW JERSEY.

MEAT-CHOPPER.

SPECIFICATION forming part of Letters Patent No. 756,713, dated April 5, 1904.

Application filed December 11, 1902. Serial No. 134,748. (No model.)

*To all whom it may concern:*

Be it known that I, JOHN A. SANDER, a citizen of the United States, residing at Newark, in the county of Essex and State of New Jersey, have invented and produced new and original Improvements in Meat-Choppers; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a meat-chopper which reduces the meat to a state of great fineness, to obtain such a meat-chopper which shall cut the meat without bruising or crushing the fiber, to secure a rotary cutter which shall act at both edges against independent surfaces or plates, to thus increase the chopping action, and to obtain other advantages and results, some of which will be referred to hereinafter in connection with the description of the working parts.

The invention consists in the improved meat-chopper and in the arrangements and combinations of parts of the same, all substantially as will be hereinafter set forth, and finally embraced in the clauses of the claim.

Figure 1:
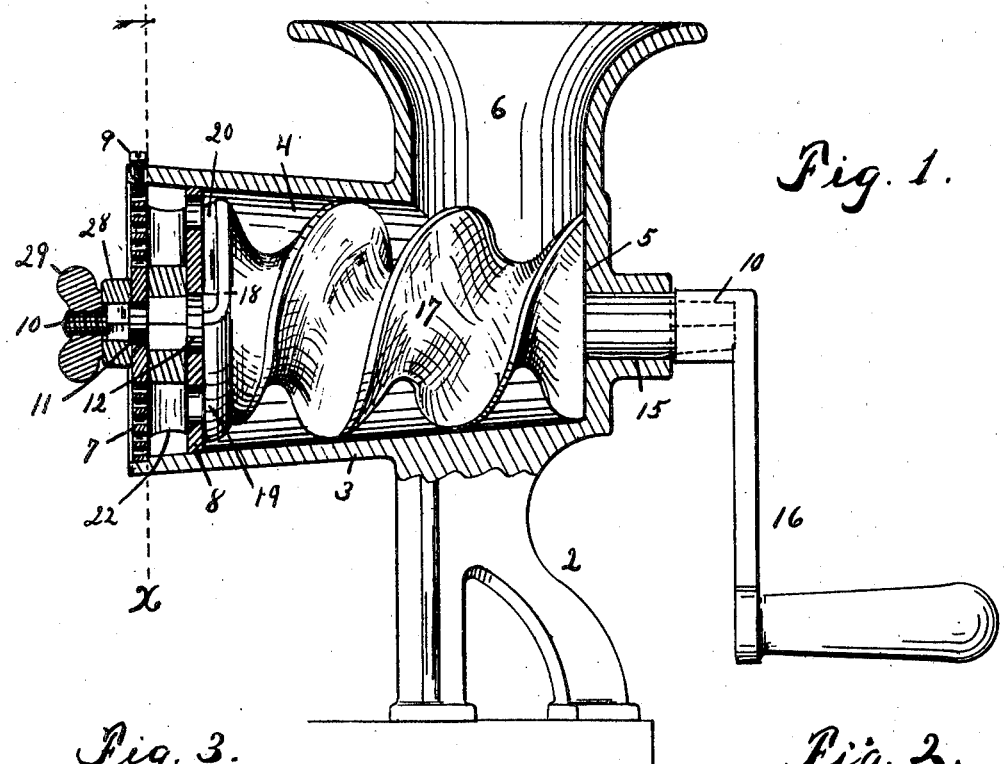
Figure 3:
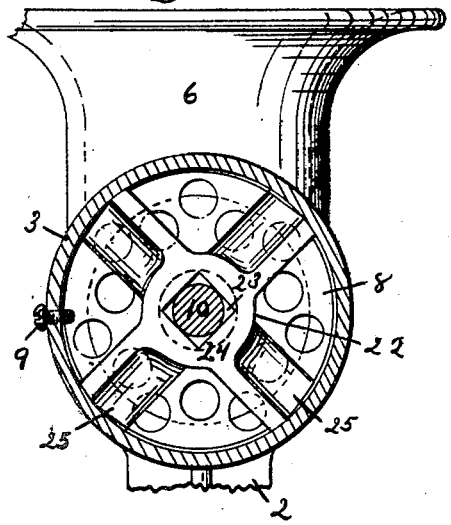
Figure 2:
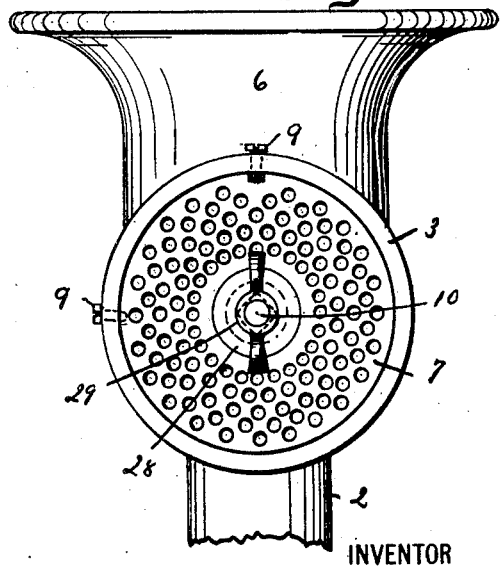
Figure 7:
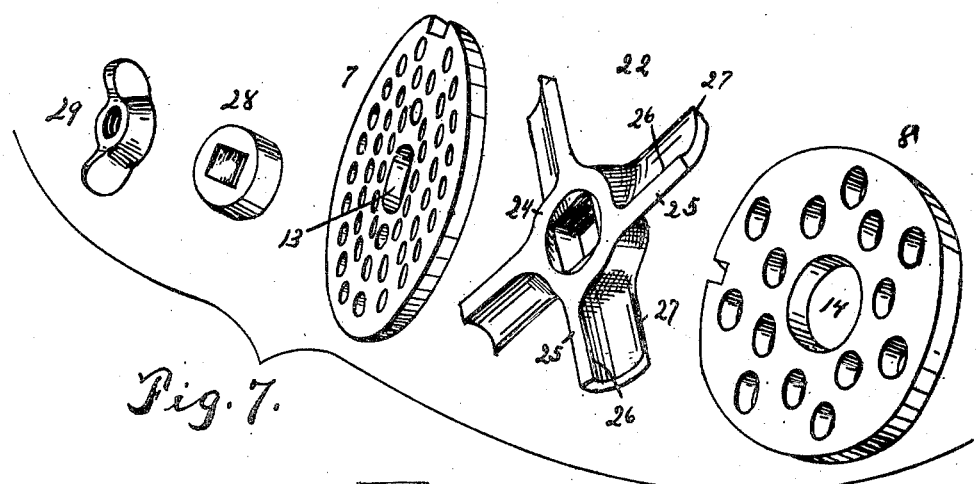
Figure 8:
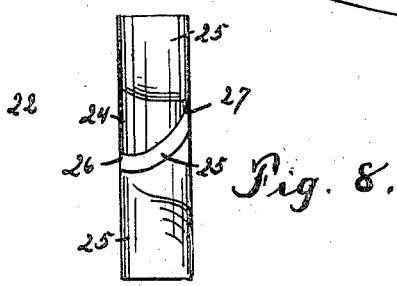
Figure 4:
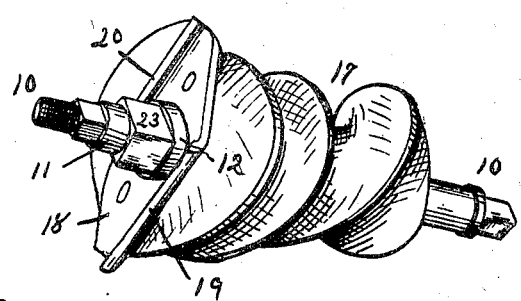
Figure 5:
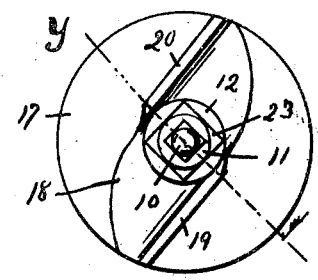
Figure 6:
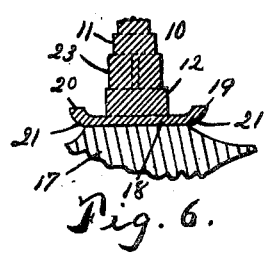

Referring to the accompanying drawings, in which like numerals of reference indicate corresponding parts in each of the several figures, Figure 1 is a side elevation of my improved machine, partly in section. Fig. 2 is an end view of the same; and Fig. 3 is a cross-section of the delivery end, as upon line *x*, Fig. 1. Fig. 4 is a perspective view of the feed-screw and its attached cutter removed, and Fig. 5 is an end view of the same. Fig. 6 is a cross-section of a certain knife-plate, as on line *y*, Fig. 5. Fig. 7 shows in perspective the successive parts adapted to be mounted upon the end of the feed-screw shaft, and Fig. 8 is an edge view of the rotary cutter.

In said drawings, 2 indicates a suitable standard supporting the usual horizontally-disposed body portion 3 of the meat-chopper. Said body portion provides a slightly-tapered passage 4 for the feeding and cutting parts hereinafter described, said passage being open at its larger end and provided at its top, near the opposite closed end 5, with a hopper 6, into which the meat is thrust. Within the larger open end of the passage 4 are stationed parallel transverse perforated plates 7 8, fitting at their peripheral edges against the walls of the passage and being held against rotation by set-screws 9, passing through the said walls into said edges or by any other equivalent means. Said plates are placed at a distance apart and have perforations of different sizes, those in the outer one being finer than those in the inner to more completely reduce the meat.

Longitudinally through the passage 4 and in axial alinement therewith extends a shaft 10, having rounded bearings 11 12 in central apertures 13 14 of the two plates 7 8 and at its opposite end having a bearing in the closed end of the body portion, as at 15, and projecting therebeyond to receive a handle 16. Upon said shaft 10, preferably integral therewith, is a screw 17, adapted to feed the meat from the hopper 6 along the passage 4 to the perforated plates 7 8. Said screw is preferably a double spiral, and the grooves narrow somewhat toward the end of the screw.

Upon the extremity of the screw 17 is fastened a knife-plate 18, conforming in shape more or less closely to the shape of the cut end of the screw and providing at its opposite edges at the extremities of the grooves of the screw knife-blades 19 20, adapted to work against the rear surface of the inner perforated plate 8 with a shearing action. Preferably said knife-blades are formed by bending up the edges of the knife-plate 18, as at 21, so that the whole surface of the plate does not work against the perforated plate and, furthermore, so that the said knife-blades will constantly remain sharp as they wear. It will be understood that the knife-plate 18 is secured flatwise upon only the entire or solid portion of the end of the screw and does not overlie or close the ends of the grooves of the screw.

Between the two perforated plates 7 8 is a cutter 22, mounted upon a squared portion 23 of the shaft 10 or otherwise adapted to turn therewith. Said cutter comprises a hub 24 and radial projecting arms 25 integral therewith and preferably four in number, although more or less may be used, if desired. Said arms are all inclined in the same direction and after the manner of a screw or propeller, as shown, so that the partially-chopped meat as it passes through the inner perforated plate 8 is urged or positively carried forward by the cutter to the outer plate 7. Said cutter-arms 25 are also transversely concaved or hollowed in end view at their front sides, as shown in Figs. 7 and 8 more especially, so that sharp cutting edges 26 27 are formed to coöperate with both plates 7 8 with a shearing action. Moreover, the rear sides of the said arms are preferably convex, so that each arm is in cross-section transversely concavo-convex. This insures narrow edges to bear against the stationary plates and imparts to the arms a greater or less resiliency, according to their thickness and width, in a transverse direction. Thus if the perforated plates are set too close together the cutter-arms will bow more and relieve the friction, while if said plates are too far apart the cutter-arms will flatten under the pressure of the meat and bring their cutting edges closer to the plates.

Outside the outer plate 7 is a washer 28 upon the shaft 10, and beyond this a hand-nut 29 is screwed upon the threaded end of the shaft to secure all said parts thereon.

In operation it will be noted that as the meat is forced against the rear side of the inner plate 8 by the pressure of the feed-screw small portions will protrude into the holes thereof and be sheared off by the knife-blades 19 20 on the end of the screw. As these pieces issue from the opposite sides of the said plate 8 they are subjected to the rear cutting edges 27 of the cutter 22, and as the smaller pieces thus formed are forced into the apertures of the outer perforated plate 7 they are again sheared by the front cutting edges 26 of the cutter 22. The meat thus issues in a finely-divided state and without having been bruised or torn.

Having thus described the invention, what I claim as new is—

1. In a meat-chopper, the combination with a tubular body portion having a feed-screw therein, and two circular perforated plates stationed transversely in said body portion in front of said screw and being substantially parallel and at a distance apart, of a cutter between said plates having radial arms each transversely concavo-convex in cross-section and forming cutting-knives at the opposite edges which point in the same directions and are adapted to cut simultaneously one against each of said plates, and a shaft for rotating said feed-screw and cutter.

2. In a meat-chopper, the combination with a perforated plate, and a feed-screw terminating adjacent to said plate of a knife-plate fixed flatwise upon the end of said screw, and having at the extreme end of the groove of said screw a marginal portion turned outward from the end of the screw at an angle to the main portion of the plate, said turned margin forming at its side a continuation of the compression-wall of the screw and at its edge a knife-edge to lie against the perforated plate and hold the main portion of the plate away therefrom.

3. In a meat-chopper, the combination with a perforated plate, and a feed-screw having a double thread and terminating adjacent to said plate, of a knife-plate fixed flatwise upon the entire portion of the end of the said screw, the opposite margins of said plate being at the edges of the rear walls of the grooves of the screw bent outward away therefrom and forming at their edges knife-edges adapted to engage the perforated plate and hold the body of the knife-plate away.

In testimony that I claim the foregoing I have hereunto set my hand this 6th day of December, 1902.

JOHN A. SANDER.

Witnesses:
C. B. PITNEY,
RUSSELL M. EVERETT.